United States Patent
Chen et al.

[19]

[11] Patent Number: 6,117,570
[45] Date of Patent: Sep. 12, 2000

[54] THIN FILM MEDIUM WITH SURFACE-OXIDIZED NIAL SEED LAYER

[75] Inventors: Qixu David Chen, Milpitas; Liji Huang, San Jose; Charles Leu, Fremont; Rajiv Yadav Ranjan, San Jose, all of Calif.

[73] Assignee: Seagate Technology, Inc., Scotts Valley, Calif.

[21] Appl. No.: 09/152,326

[22] Filed: Sep. 14, 1998

Related U.S. Application Data

[60] Provisional application No. 60/078,620, Mar. 19, 1998.

[51] Int. Cl.[7] .................................................. G11B 5/66
[52] U.S. Cl. ........................ 428/694 T; 428/694 TS; 428/336; 428/900; 427/128; 427/129; 427/130
[58] Field of Search ...................... 428/694 T, 694 TS, 428/900, 336; 427/128–130

[56] References Cited

U.S. PATENT DOCUMENTS

| | | | |
|---|---|---|---|
| 5,302,434 | 4/1994 | Doerner | 360/135 |
| 5,846,648 | 12/1998 | Chen | 428/332 |
| 5,879,783 | 3/1999 | Chang | 428/141 |
| 5,981,018 | 11/1999 | Lai | 428/65.5 |
| 6,010,795 | 1/2000 | Chen | 428/611 |

OTHER PUBLICATIONS

Lee, Li–Lien et al., "NiAl Underlayers For CoCrTa Magnetic Thin Films", IEEE Transactions on Magnetics, vol. 30, No. 6, Nov. 1994, pp. 3951–3953.

Ross, C.A. et al., "The role of NiAl Underlayers in longitudinal recording media (abstract)", Journal of Applied Physics, vol. 81, No. 8, Apr. 15, 1997, pp. 4369.

*Primary Examiner*—Leszek Kiliman
*Attorney, Agent, or Firm*—McDermott, Will & Emery

[57] ABSTRACT

High areal density magnetic recording media exhibiting low noise are formed with a surface oxidized NiAl seed layer. Embodiments include forming the surface oxidized NiAl seed layer on a glass or glass-ceramic substrate, and sequentially depositing a Cr or Cr-alloy, such as CrV, an intermediate CoCrTa layer and a CoCrPtTa magnetic layer.

20 Claims, 7 Drawing Sheets

THIN FILM MEDIUM WITH SURFACE-OXIDIZED NIAL SEED LAYER

RELATED APPLICATIONS

This application claims priority from Provisional Application Ser. No. 60/078,620 filed on Mar. 19, 1998 entitled: THIN FILM MEDIUM WITH A SURFACE OXIDIZED NiAl LAYER", the entire disclosure of which is hereby incorporated herein by reference.

TECHNICAL FIELD

The present invention relates to magnetic recording media, such as thin film magnetic recording disks, and to a method of manufacturing the media. The invention has particular applicability to high areal density magnetic recording media exhibiting low noise, low signal modulation and high off-track capacity.

BACKGROUND ART

The increasing demands for higher areal recording density impose increasingly greater demands on thin film magnetic recording media in terms of remanent coercivity (Hr), magnetic remanance (Mr), coercivity squareness (S*), medium noise, i.e., signal-to-noise ratio (SNR), and narrow track recording performance. It is extremely difficult to produce a magnetic recording medium satisfying such demanding requirements.

The linear recording density can be increased by increasing the Hr of the magnetic recording medium. This objective can be accomplished by decreasing the medium noise, as by maintaining very fine magnetically noncoupled grains. Medium noise in thin films is a dominant factor restricting increased recording density of high density magnetic hard disk drives, and is attributed primarily to inhomogeneous grain size and intergranular exchange coupling. Accordingly, in order to increase linear density, medium noise must be minimized by suitable microstructure control.

A conventional longitudinal recording disk medium on a glass substrate is depicted in FIG. 1 and comprises a substrate 10 of a glass, ceramic, or glass-ceramic material. There are typically sequentially sputter deposited on each side of substrate 10 an adhesion enhancement layer 11, 11', e.g., chromium (Cr) or a Cr alloy, a seed layer 12, 12', such as NiP, an underlayer 13, 13', such as Cr or a Cr alloy, a magnetic layer 14, 14', such as a cobalt (Co)-based alloy, and a protective overcoat 15, 15', such as a carbon-containing overcoat. Typically, although not shown for illustrative convenience, a lubricant topcoat is applied on the protective overcoat 15, 15'.

It is recognized that the magnetic properties, such as Hr, Mr, S* and SNR, which are critical to the performance of a magnetic alloy film, depend primarily upon the microstructure of the magnetic layer which, in turn, is influenced by the underlying layers, such as the underlayer. It is also recognized that underlayers having a fine grain structure are highly desirable, particular for growing fine grains of hexagonal close packed (HCP) Co alloys deposited thereon.

It has been reported that nickel-aluminum (NiAl) films exhibit a grain size which is smaller than similarly deposited Cr films, which are the underlayer of choice in conventional magnetic recording media. Li-Lien Lee et al.,"NiAl Underlayers For CoCrTa Magnetic Thin Films", IEEE Transactions on Magnetics, Vol. 30, No. 6, pp. 3951–3953, 1994. Accordingly, NiAl thin films are potential candidates as underlayers for magnetic recording media for high density longitudinal magnetic recording. However, it was found that the coercivity of a magnetic recording medium comprising an NiAl underlayer is too low for high density recording, e.g. about 2,000 Oersteds (Oe). The use of an NiAl underlayer is also disclosed by C. A. Ross et al.,"The Role Of An NiAl Underlayers In Longitudinal Thin Film Media", J. Appl. Phys. 81(a), P.4369, 1997.

In order to increase Hr, magnetic alloys containing platinum (Pt), such as Co—Cr—Pt-tantalum (Ta) alloys have been employed. Although Pt enhances film Hr, it was found that Pt also increases media noise. Accordingly, it has become increasingly difficult to achieve high areal recording density while simultaneously achieving high SNR and high Hr.

In copending U.S. patent application Ser. No. 08/945,084 filed on Oct. 17, 1997 now U.S. Pat. No. 6,010,795, a magnetic recording medium is disclosed comprising a surface oxidized seed layer, e.g. NiP, and sequentially deposited thereon a Cr-containing sub-underlayer, a NiAl or iron aluminum (FeAl) sub-underlayer, a Cr-containing intermediate layer and a magnetic layer.

There exists a need for high areal density magnetic recording media exhibiting high Hr and high SNR. There also exists a need for magnetic recording media containing a glass or glass ceramic substrate exhibiting high Hr, high SNR, low signal modulation and high off-track capacity.

DISCLOSURE OF THE INVENTION

An advantage of the present invention is a magnetic recording medium for high areal recording density exhibiting low noise and high Hr.

Another advantage of the present invention is a method of manufacturing a magnetic recording medium suitable for high areal recording density and exhibiting low noise and high Hr.

Additional advantages and features of the present invention will be set forth in part in the description which follows and in part will become apparent to those having ordinary skill in the art upon examination of the following only to be learned from the practiced invention. The advantages of the present invention maybe realized and obtained and particularly pointed out in the appended claims.

According to the present invention, the foregoing and other advantages are achieved by a magnetic recording medium comprising a non-magnetic substrate; a NiAl seed layer having an oxidized surface on the non-magnetic substrate; and a magnetic layer.

Another aspect of the present invention is a method of manufacturing a magnetic recording medium, the method comprising depositing a nickel aluminum seed layer on a non-magnetic substrate; oxidizing the surface of the nickel aluminum seed layer; and depositing a magnetic layer.

Additional advantages of the present invention will become readily apparent to those skilled in this art from the following detailed description, wherein only the preferred embodiments of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature and not as restrictive.

DESCRIPTION OF THE INVENTION

Figure 1:
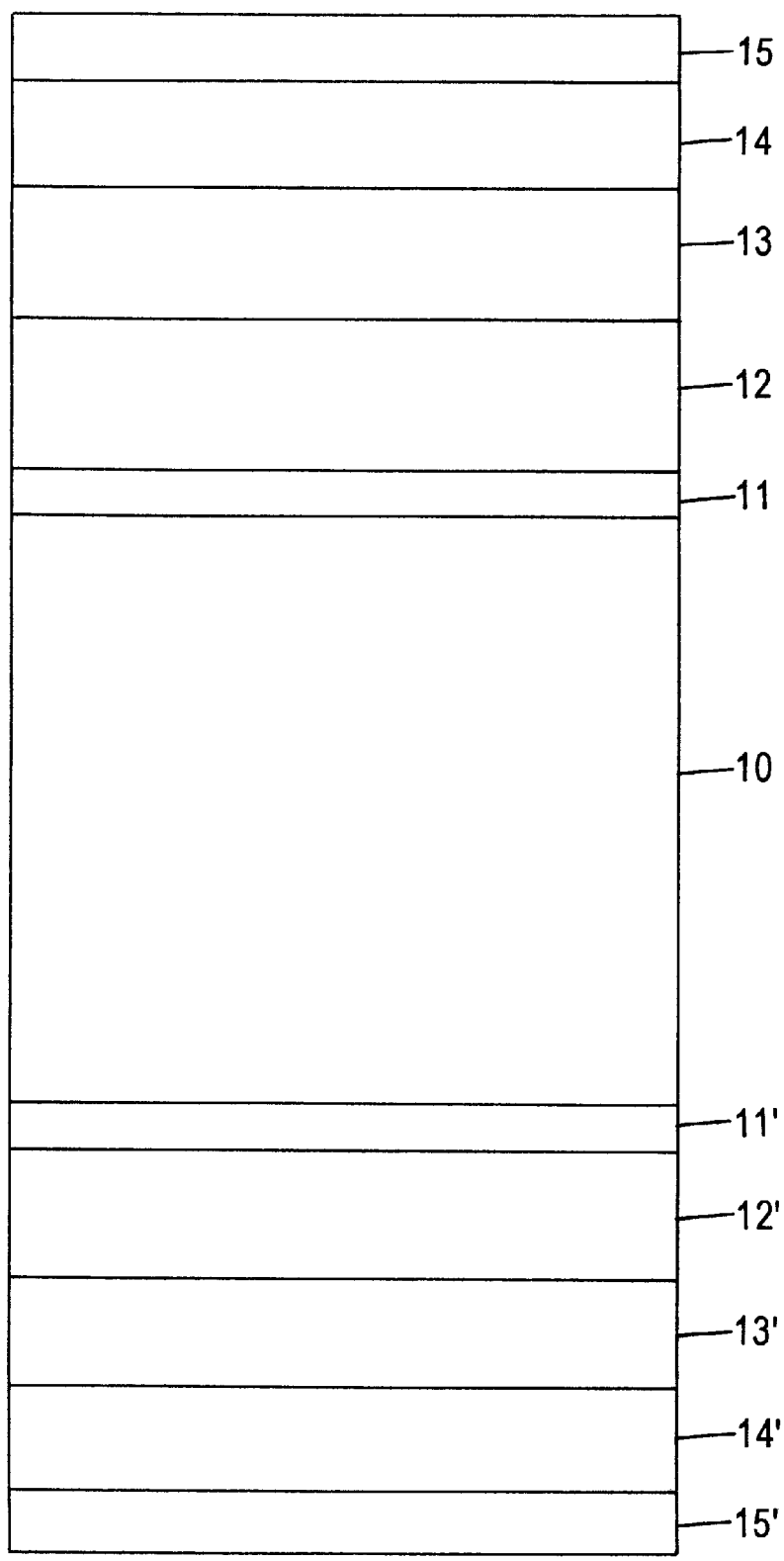
FIG. 1 schematically depicts a conventional magnetic recording medium structure.

The present invention provides magnetic recording media suitable for high areal recording density exhibiting high Hr, high SNR, low signal modulation and high off-track capacity. The present invention achieves such technological advantages by strategically reducing the size of the grains of the underlayer and magnetic layer while increasing the uniformity of the grains of the underlayer and magnetic layer. In accordance with embodiments of the present invention, an NiAl seed layer is deposited on a non-magnetic substrate, such as a glass or glass-ceramic substrate. The surface of the NiAl seed layer is then intentionally oxidized yielding improvements in a variety of recording characteristics vis-à-vis substantially the same media having a NiAl seed layer without an oxidized surface. The NiAl seed layer employed in the present invention can contain about 41 to about 55 at. % Al the balance Ni.

The exact mechanism by which surface oxidation of the NiAl seed layer achieves superior recording performance, e.g., higher SNR, reduced cross-track correlation, reduced modulation and increased off-track capability, is not known with certainty. It is believed, however, that a surface oxidized NiAl seed layer on a glass or glass-ceramic substrate induces the epitaxial growth of the subsequently deposited underlayer and magnetic layer thereon with extremely uniform, small and substantially magnetically uncoupled grains.

Embodiments of the present invention include sputter depositing a NiAl seed layer on a glass or glass-ceramic substrate and oxidizing the surface of the sputter deposited NiAl seed layer at a suitable temperature, e.g. about 100° C. to about 300° C., in an oxidizing atmosphere. Suitable oxidizing atmospheres contain about 1 to about 100 volume percent of oxygen ($O_2$), the remainder an inert gas, such as argon (Ar), e.g. about 5 to about 25 volume percent oxygen, such as about 20 percent by volume oxygen. The surface oxidized NiAl seed layer typically has a thickness of about 100 Å to about 800 Å, such as about 300 Å to about 500 Å, e.g. about 400 Å. The degree of oxidation can be such that the amount of oxygen in the top 50 Å NiAl layer, after in situ sputter removal of the 40 Å surface layer, is about 15 at. % to about 50 at. %, such as about 20 at. % to about 30 at. %.

In the oxidation technique disclosed by Doerner et al. in U.S. Pat. No. 5,302,434, the NiP film is oxidized such that the nickel is oxidized. However, in accordance with the present invention, it was found that it is the Al which is oxidized without any substantial oxidation of Ni. In embodiments of the present invention, the oxidized surface of the NiAl layer contains substantially elemental Ni, while Al is present in the form of about 75 at. % oxide and about 25 at. % substantially elemental Al, to a depth of about 50 Å from the surface. Even at greater depths from the surface, such as about 160 Å, the aluminum oxide/aluminum metal ratio is about 0.45. However, Ni is predominately present substantially in its elemental form throughout the entire film.

Embodiments of the present invention include deposition of an underlayer, such as Cr or a Cr-alloy underlayer, e.g. chromium vanadium (CrV), on the surface oxidized NiAl seed layer. Embodiment of the present invention also include depositing, a thin intermediate magnetic layer of cobalt-chromium-tantalum (CoCrTa) on the underlayer and depositing the magnetic layer on the CoCrTa intermediate layer. The intermediate CoCrTa layer can comprise about 10 to about 20 at. % Cr and about 1 to about 6 at. % Ta. Embodiments of the present invention include the use of any of various of magnetic alloy layers, such as Co-alloys, e.g., cobalt-chromium-platinum-tantalum (CoCrPtTa) magnetic alloys.

Figure 2:
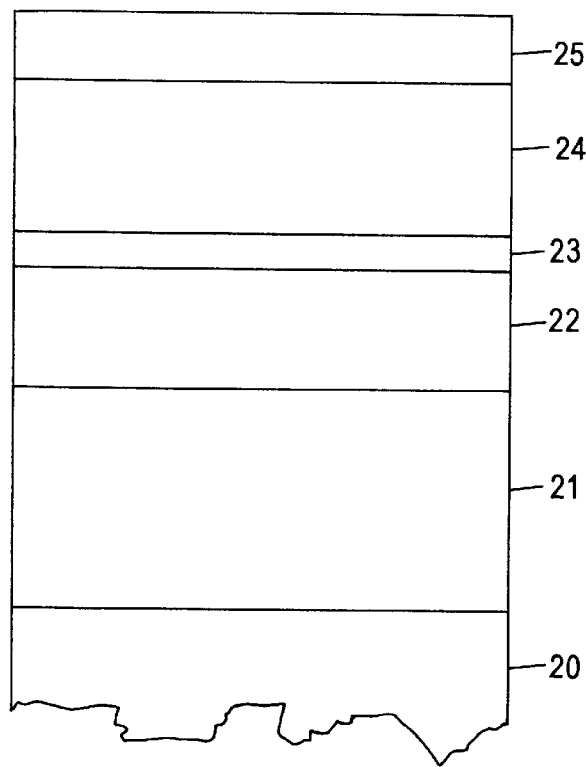
FIG. 2 schematically depicts a magnetic recording medium in accordance with an embodiment of the present invention.

An embodiment of the present invention is schematically illustrated in FIG. 2 and comprises a non-magnetic substrate 20. for illustrative convenience, sequentially sputter deposited layers are shown only on one side of substrate 20. However, it is understood that the present invention comprises sputter depositing sequentially layers on both sides of substrate 20, as in FIG. 1.

Adverting to FIG. 2, a seed layer of NiAl is deposited on substrate 20, e.g. a glass or glass-ceramic substrate. The surface of an NiAl seed layer 21 is surface oxidized, as by exposure to an oxidizing environment. Subsequently, an underlayer, such as CrV, is sputter deposited on the surface oxidized NiAl seed layer 21. An optional intermediate or flash layer of CoCrTa 23 is then sputter deposited on underlayer 22. The use of an intermediate CoCrPt layer is disclosed in co-pending U.S. application Ser. No. 09/188, 681, filed on Nov. 10, 1998, co-pending U.S. application Ser. No. 09/188,715, filed on Nov. 10, 1998 and co-pending U.S. application Ser. No. 09/188,682 filed on Nov. 10, 1998, the entire disclosures of which are hereby incorporated herein by reference. The use of an intermediate CoCrTa layer increases the coercivity of the magnetic films.

Magnetic layer 24 is then sputter deposited on the intermediate CoCrTa layer, such as a Co-alloy layer, e.g., CoCrPtTa. A protective covering overcoat 25 is then sputter deposited on the non-magnetic layer 24. As in conventional practices, a lubricant topcoat (not shown for illustrative convenience) is deposited on the protective covering overcoat 25.

Figure 3:
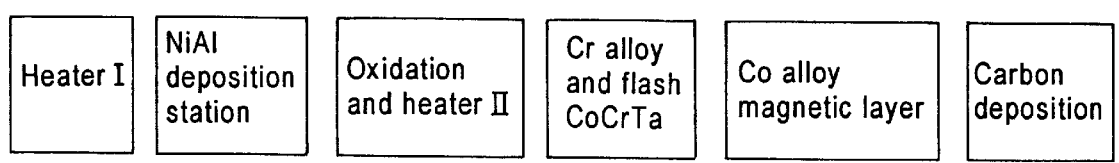
FIG. 3 schematically illustrates a sputtering system for use in implementing embodiments of the present invention.

An apparatus for manufacturing magnetic recording media in accordance with the embodiments of the present invention is schematically illustrated in FIG. 3. The disk substrates travel sequentially from heater I to the NiAl deposition station and then to the oxidation and heater station II. Subsequent to oxidation, the disk substrates are passed through the Cr alloy underlayer and flash CoCrTa layer deposition station wherein the Cr alloy underlayer is deposited and the optional CoCrTa flash layer is deposited, typically at thickness of about 1.5 to about 150 Å, e.g. about 5 to about 30 Å. The disks are then passed to the magnetic layer deposition station and then to the protective carbon overcoat deposition station.

EXAMPLES

Magnetic recording media in accordance with embodiments of the present invention comprising a surface oxidized NiAl seed layer exhibit a variety of improved recording characteristics. Such improved characteristics are shown in FIGS. 4–7 which compare various recording characteristics of magnetic recording media in accordance with embodiments of the present invention comprising a surface-oxidized NiAl seed layer with magnetic recording media containing an NiAl seed layer which is not surface oxidized. The compared media were essentially the same in all other respects and produced by essentially the same techniques, except for surface oxidation of the NiAl seed layer. Magnetic recording media representative of the present invention and comparison magnetic recording media had essentially the same film structure on a glass-ceramic substrate., i.e. sequentially sputter deposited layers of NiAl/CrV/CoCrTa/CoCrPtTa/C. The composition in at. % of the films are listed in Table I below.

TABLE I

| layer     | NiAl |    | CrV |    | CoCrTa |    |    | CaCrPtTa |    |    |
|-----------|------|----|-----|----|--------|----|----|----------|----|----|
| element   | Ni   | Al | Cr  | V  | Co     | Cr | Ta | Co       | Cr | Pt | Ta |
| atomic %  | 50   | 50 | 80  | 20 | 82     | 14 | 4  | 71       | 17 | 8  | 4  |

The NiAl seed layer was oxidized in a vacuum station at about 5 mTorr of a gas mixture comprising about 20 percent by volume of oxygen, with the balance argon, at a substrate temperature of about 150° C. for about 5 seconds. The NiAl seed layer had a thickness of about 500 Å; the CrV underlayer had a thickness of about 250 Å; and the CoCrTa film had a thickness of about 7 Å. In FIGS. 4–7, $M_r t$ represents the product of magnetic remanence and the thickness of the magnetic layer. The recording data were obtained utilizing a spin valve giant magnetoresistive (GMR) head at 250,000 flux reverse per inch (KFCI). All the samples illustrated in FIGS. 4–7 have a remanent coercivity of about 2800 Oe.

The results indicate that magnetic recording media in accordance with the present invention comprising a surface oxidized NiAl seed layer exhibit weaker intergranular exchange coupling indicated by smaller cross-track correlation length, which is responsible for the higher SNR. Magnetic recording media in accordance with the present invention containing a surface-oxidized NiAl seed layer also exhibit lower signal modulation and higher off-track capacity, which are extremely important factors in achieving high areal recording density.

Figure 4:
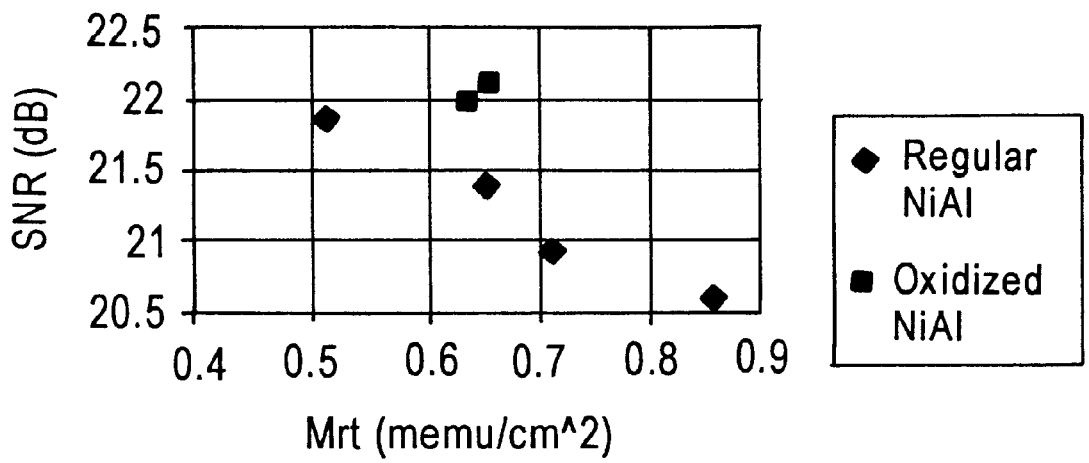
FIG. 4 compares the SNR of a medium in accordance with the present invention with a magnetic recording medium containing a NiAl seed layer having an unoxidized surface.
Figure 5:
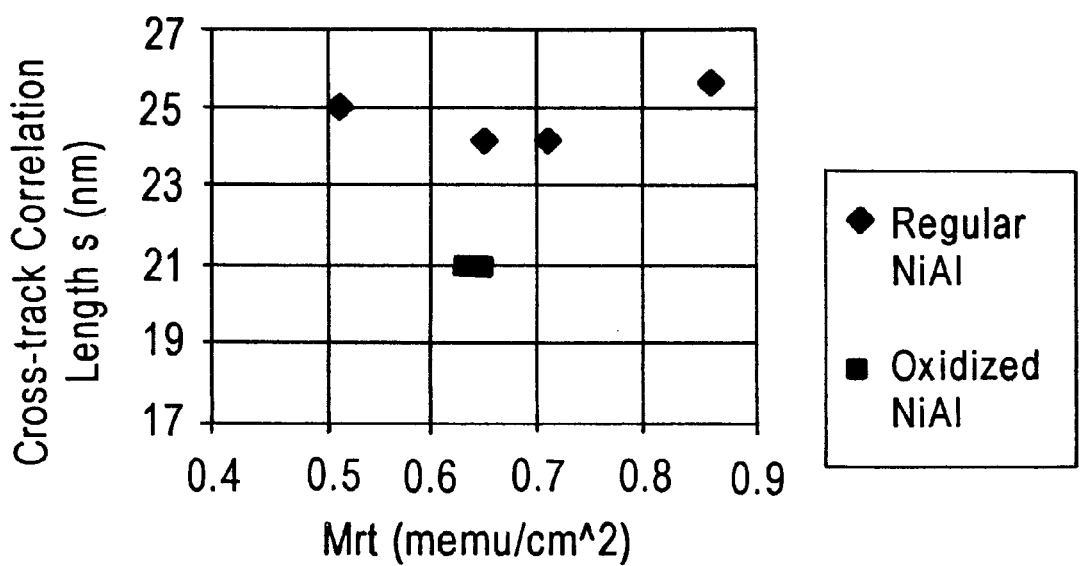
FIG. 5 compares the cross-track correlation length of a magnetic recording medium in accordance with the present invention with a magnetic recording medium containing a NiAl seed layer having an unoxidized surface.
Figure 6:
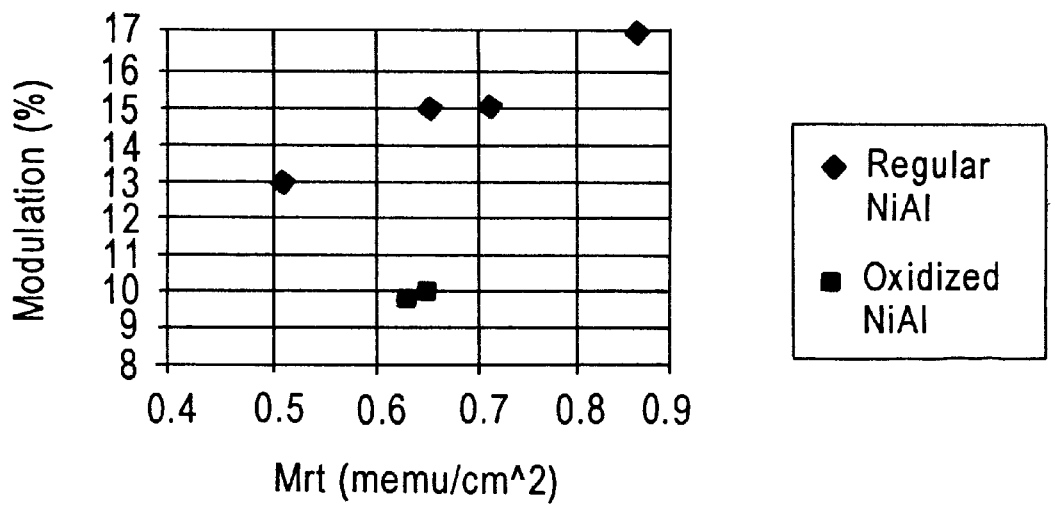
FIG. 6 compares the modulation of a magnetic recording medium in accordance with the present invention with a magnetic recording medium having a NiAl seed layer having an unoxidized surface.
Figure 7:
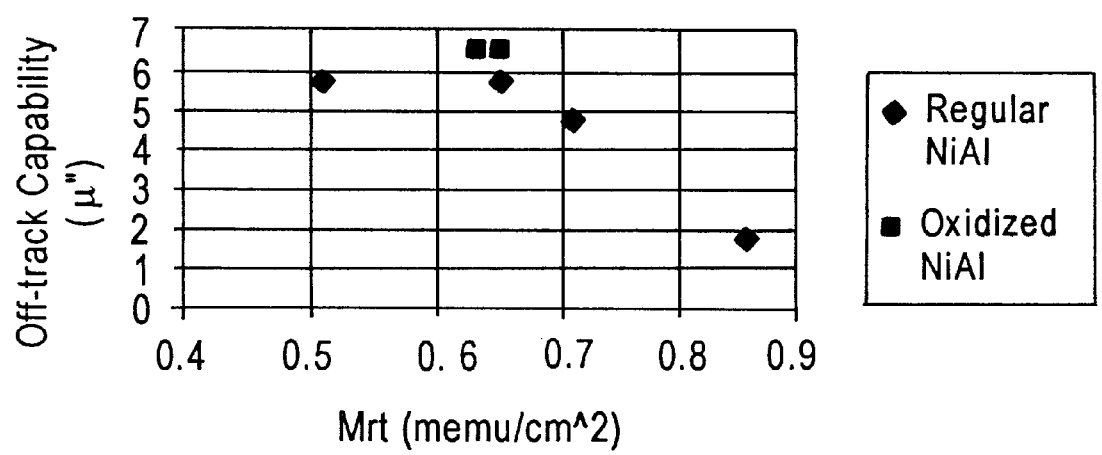
FIG. 7 compares the off-track capability of a magnetic recording medium in accordance with the present invention with a magnetic recording medium having a NiAl seed layer having an unoxidized surface.

As apparent from FIG. 4, the inventive magnetic recording medium containing a surface oxidized NiAl seed layer exhibits a higher SNR than a corresponding medium without the surface oxidized NiAl seed layer. FIG. 5 shows that the inventive medium containing a surface oxidized NiAl seed layer exhibits a lower cross-track correlation length than a corresponding medium with a NiAl seed layer without an oxidized surface. FIG. 6 illustrates that the inventive magnetic recording medium containing a surface oxidized NiAl seed layer exhibits lower modulation than a corresponding medium with a NiAl seed layer without an oxidized surface. FIG. 7 illustrates that the inventive medium containing a surface oxidized NiAl seed layer exhibits a greater off-track capability than a corresponding medium containing a NiAl seed layer without an oxidized surface.

Transmission electron microscopy (TEM) was conducted on various samples. It was found that media containing the surface oxidized NiAl seed layer exhibited extremely well developed epitaxial growth of the CrV underlayer and CoCrPtTa magnetic layer.

Figure 8:
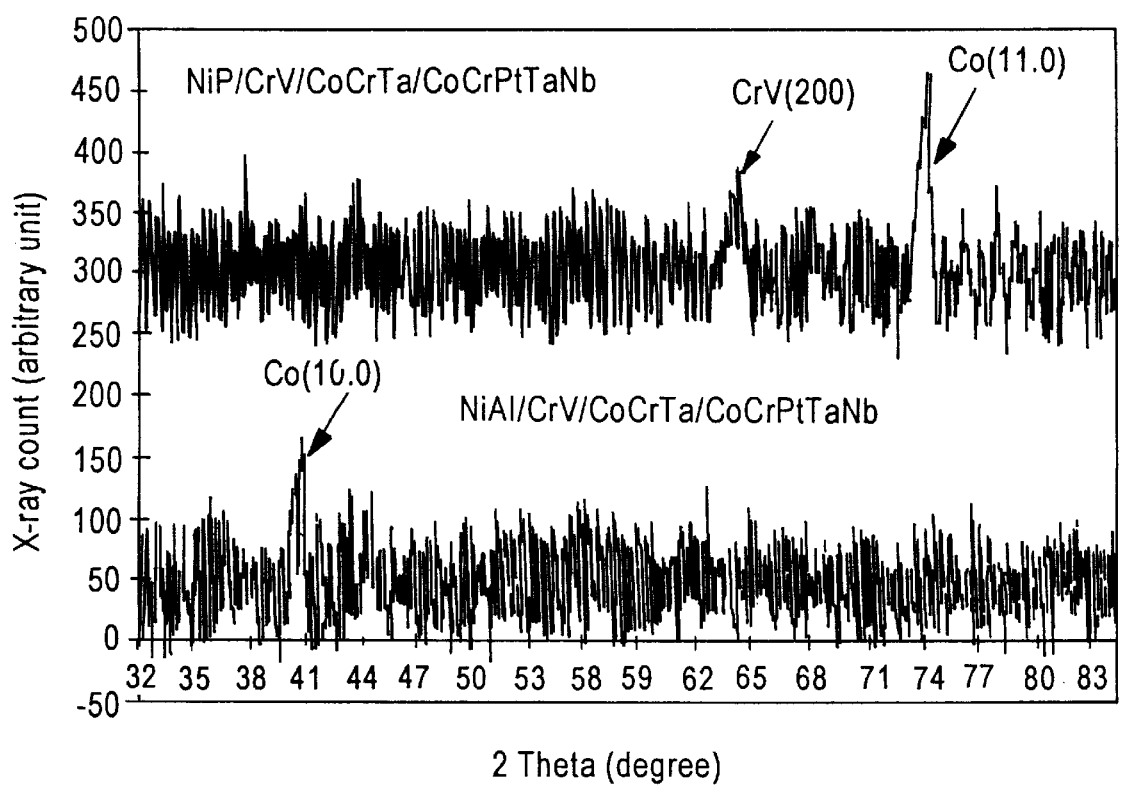
FIG. 8 illustrates x-ray diffraction patterns of glass media with surface-oxidized NiP and surface-oxidized NiAl seed layers.

FIG. 8 shows that the crystallographic orientations of CrV/CoCrTa/CoCrPtTa films with a surface oxidized NiP and NiAl layers are totally different. The media with surface oxidized amorphous NiP layers exhibit a Co (11.0) texture. However, the media with the surface-oxidized crystalline NiAl layers exhibit a (10.0) texture, which constitutes further evidence of well developed epitaxial film growth on surface oxidized NiAl seed layers.

Figure 9:
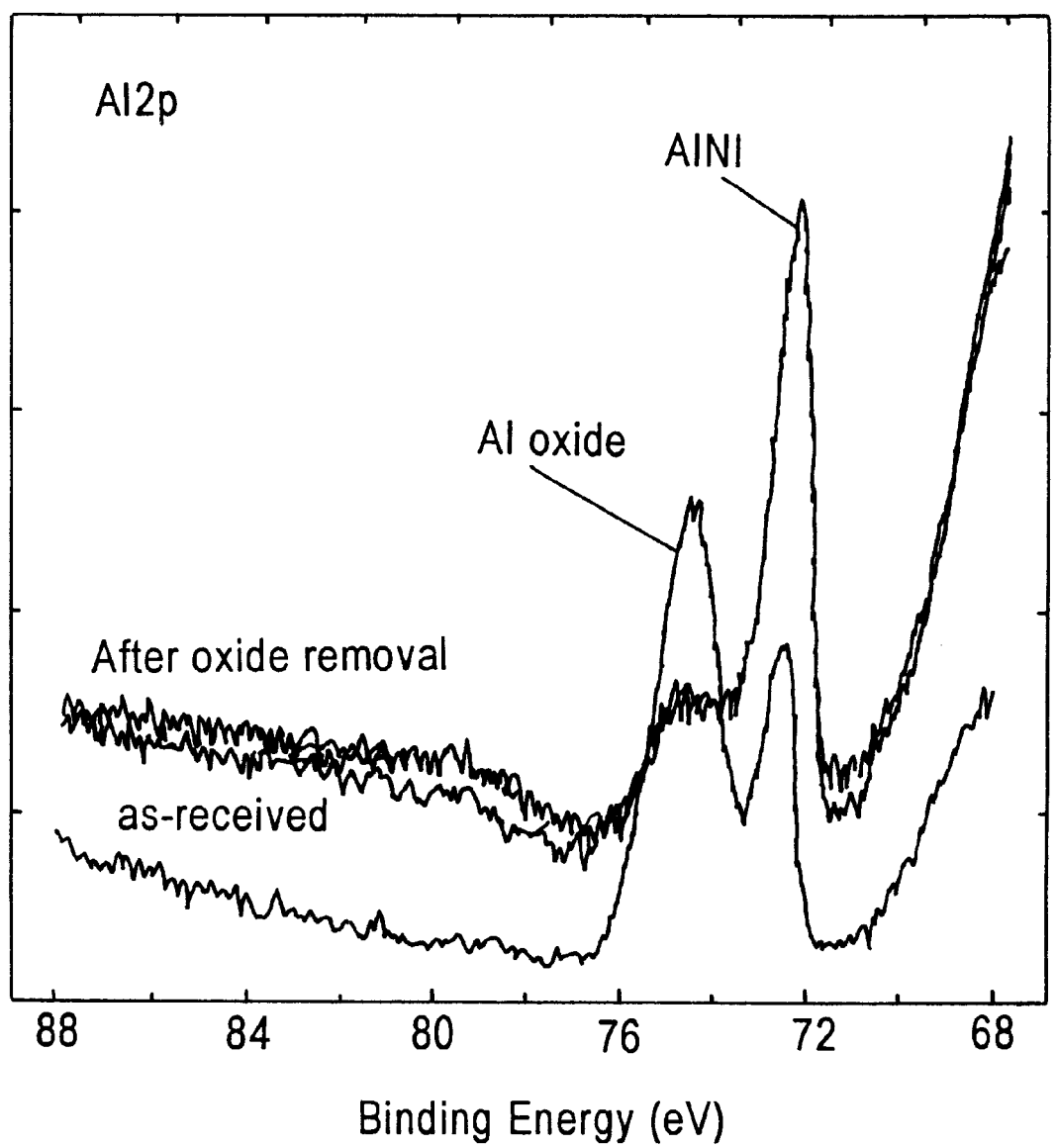
FIG. 9 shows the Aluminum (Al) 2p ESCA spectra for the surface-oxidized NiAl film of the present invention and the same film after in situ sputter removal of the top oxide layer.
Figure 10:
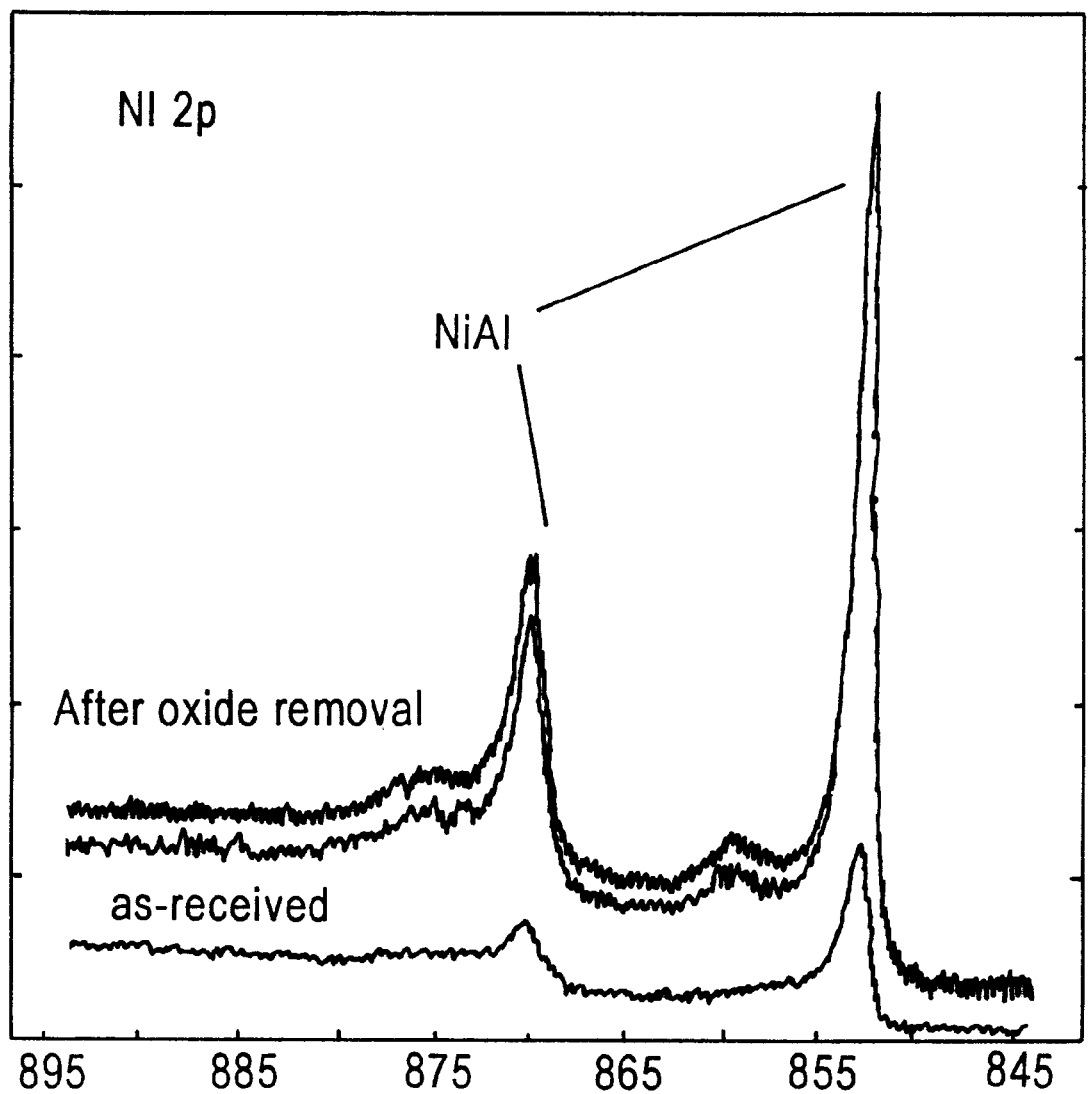
FIG. 10 shows the Nickel (Ni) 2p ESCA spectra for the surface-oxidized NiAl film of the present invention and the same film after in situ sputter removal of the top oxide layer.

FIGS. 9 and 10 are ESCA (electron spectroscopy for chemical analysis) spectra for the x-ray induced 2p photoelectrons of Al and Ni, respectively, in the surface-oxidized NiAl films. The ESCA survey and high resolution spectra for the Ni (2p) and Al (2p) signal regions were taken from the as received surface and after Ar ion sputtering to etch depths of 40, 80, 160, and 320 Å from the top surface of the surface-oxidized NiAl films. The overlayed Al (2p) and Ni (2p) spectra are shown in FIGS. 9 and 10. The Al (2p) spectrum consists of two components originated from the elemental aluminum (71.4 eV) and aluminum oxide binding state (73.4 eV), respectively. The Ni ($2p_{3/2}$) spectrum shows only the nickel elemental binding state at 851.7 eV. All binding energies are calibrated to the C(1s) photoelectron peak at 284.6 eV.

Within the near surface region of about 50 Å, Al is present at about 75 at. % in the oxidized form and about 25 at % as elemental metal. After ion etching to a depth of 160 Å, the aluminum oxide/aluminum metal ratio is about 0.45. Ni, in contrast, is predominately present substantially in its elemental metal form throughout the entire NiAl seed layer.

Thus, it would appear that the surface morphology of the NiAl seed layer is modified by surface oxidation such that, substantially elemental Ni metal and a mixture of aluminum oxide and substantially elemental Al metal aluminum are present. The resulting surface morphology is conducive for very highly developed epitaxial growth of an underlayer and magnetic layer thereon, resulting in weaker intergranular exchange coupling indicated by a small cross-track correlation length and higher SNR. The inventive magnetic recording media comprising a surface oxidized NiAl seed layer also exhibit lower signal modulation and higher off-track capacity vis-á-vis corresponding magnetic recording media with a NiAl seed layer which has not been surfaced oxidized.

The present invention advantageously provides high areal recording density magnetic recording media exhibiting reduced grain exchange interactions and, hence, reduced medium noise. Magnetic recording media in accordance with the present invention also exhibit high coercivity, lower signal modulation and higher off-track capacity, which are conducive for high areal recording density. The present invention is applicable to the production of various of types of magnetic recording media, and is not limited to any particular substrate material, underlayer, magnetic layer, protective overcoat or lubricant topcoat.

Only certain embodiments of the present invention and but a few examples of its versatility are shown and described in the present disclosure. It is to be understood that the present invention is capable of use in various other combinations and in environments, and is capable of changes and modifications within the scope of the inventive concept as expressed herein.

What is claimed is:

1. A magnetic recording medium comprising:

a non-magnetic substrate;

a nickel aluminum seed layer having an oxidized surface on the non-magnetic substrate; and a magnetic layer.

2. The magnetic recording medium according to claim 1, further comprising an underlayer on the surface oxidized nickel aluminum seed layer and the magnetic layer on the underlayer.

3. The magnetic recording medium according to claim 2, wherein the underlayer comprises chromium or a chromium-alloy.

4. The magnetic recording medium according to claim 3, wherein:

the non-magnetic substrate comprises a glass or glass-ceramic material; and the underlayer comprises a chromium-vanadium alloy.

5. The magnetic recording medium according to claim 3, wherein the surface oxidized nickel aluminum seed layer has a thickness of about 100 Å to about 800 Å.

6. The magnetic recording medium according to claim 4, further comprising an intermediate cobalt-chromium-tantalum alloy layer on the underlayer.

7. The magnetic recording medium according to claim 6, wherein the magnetic layer comprises an alloy of cobalt, chromium, platinum and tantalum.

8. The magnetic recording medium according to claim 3, wherein the nickel aluminum seed layer comprises about 15 to about 50 at. % oxygen in a top 50 Å region after in situ sputter removal of a 40 Å surface layer.

9. The magnetic recording medium according to claim 8, wherein the surface of the nickel aluminum seed layer comprises substantially elemental nickel and aluminum is present in the form of about 75 at. % aluminum oxide and about 25% at. % substantially elemental aluminum.

10. The magnetic recording medium according to claim 1, wherein the magnetic layer exhibits a (10.0)-dominant crystallographic orientation.

11. A method of manufacturing a magnetic medium, the method comprising:

depositing a nickel aluminum seed layer on a non-magnetic substrate;

oxidizing the surface of the nickel aluminum seed layer; and depositing a magnetic layer.

12. The method according to claim 11, comprising oxidizing the surface of the nickel aluminum seed layer in an atmosphere containing about 1 to about 100 volume percent oxygen and up to 99 volume percent of an inert gas.

13. The method according to claim 12, comprising oxidizing the nickel aluminum seed layer in an atmosphere containing about 5 to about 25 volume percent oxygen.

14. The method according to claim 11, wherein the magnetic layer exhibits a (10.0)-dominant crystallographic orientation.

15. The method according to claim 11, further comprising depositing a chromium or chromium-alloy underlayer on the surface oxidized nickel aluminum seed layer.

16. The method according to claim 15, wherein the surface oxidized nickel aluminum seed layer has a thickness of about 100 Å to about 800 Å.

17. The method according to claim 15, further comprising an intermediate cobalt-chromium-tantalum layer on the underlayer.

18. The method according to claim 15, wherein;

the non-magnetic substrate comprises a glass or a glass-ceramic material; and the underlayer comprises a chromium-vanadium alloy.

19. The method according to claim 15, wherein the surface of the nickel aluminum seed layer comprises substantially elemental nickel, and aluminum is present as about 25 at. % substantially elemental aluminum and about 75 at. % aluminum oxide.

20. The method according to claim 18, wherein the magnetic layer comprises an alloy of cobalt, chromium, platinum and tantalum.

* * * * *